(12) United States Patent
Tompkins

(10) Patent No.: US 6,558,042 B1
(45) Date of Patent: May 6, 2003

(54) BEARING GUIDED FERROFLUID SEAL AND SEAL CARRIER

(75) Inventor: John C. Tompkins, Boulder, CO (US)

(73) Assignee: SAE Magnetics(H. K.) Ltd. (HK)

( * ) Notice: Subject to any disclaimer, the term of this patent is extended or adjusted under 35 U.S.C. 154(b) by 0 days.

(21) Appl. No.: 10/040,075

(22) Filed: Dec. 28, 2001

(51) Int. Cl.$^7$ .............................................. F16C 33/82
(52) U.S. Cl. ........................ 384/133; 384/478; 277/410
(58) Field of Search ................................ 384/133, 446, 384/478, 484, 486; 277/410, 347

(56) References Cited

U.S. PATENT DOCUMENTS

| | | | |
|---|---|---|---|
| 4,842,426 A | * | 6/1989 | Furumura et al. ............ 384/478 |
| 5,009,436 A | * | 4/1991 | Endo et al. ................. 277/410 |
| 5,011,165 A | * | 4/1991 | Cap ............................ 384/133 |
| 5,227,686 A | | 7/1993 | Ogawa |
| 5,238,254 A | | 8/1993 | Takii et al. |
| 5,593,164 A | | 1/1997 | Mraz et al. |
| 5,876,037 A | | 3/1999 | Ishizaki et al. |
| 5,876,126 A | | 3/1999 | Marshall et al. |

FOREIGN PATENT DOCUMENTS

GB              599095            3/1948

\* cited by examiner

Primary Examiner—Thomas R. Hannon
(74) Attorney, Agent, or Firm—Karen Dana Oster

(57) ABSTRACT

A bearing guided ferrofluid seal and seal carrier system that may be used with a bearing assembly with an outer annular ring surface. A seal carrier of the present invention has a carrier ferrofluid seal surface and a carrier bearing surface that includes a first carrier bearing surface and a second carrier bearing surface. A ferrofluid seal may be attached to the carrier ferrofluid seal surface and fixtured to the second carrier bearing surface. The second carrier bearing surface may be attached to the outer annular ring surface. In one preferred embodiment the first carrier bearing surface may be attached to the upper annular ring surface. In a separate preferred embodiment the ferrofluid seal may be attached to the carrier ferrofluid seal surface so that the seal inner diameter of the ferrofluid seal is fixtured to the second carrier bearing surface in order to minimize runout.

21 Claims, 3 Drawing Sheets

BEARING GUIDED FERROFLUID SEAL AND SEAL CARRIER

BACKGROUND OF THE INVENTION

The following invention relates to a bearing guided ferrofluid seals and unique seal carriers for use in electric spindle motors having bearing assemblies with an outer annular ring surface.

Conventional electric spindle motors of the type used in disk drives conventionally use ball bearing assemblies to facilitate movement between a rotary member and a stationary member. As shown in FIGS. 2 and 3, bearing assemblies 18 generally include metallic or ceramic ball bearings 24 that are positioned between an inner bearing race or ring 20 and an outer bearing race or ring 22. Bearing assemblies 18 may be either inner or outer rotators depending on whether the shaft 28 (which is substantially adjacent the inner bearing ring 20) is stationary or whether a combination of the shaft 28 and hub 32 rotate together. Inner rotators have an inner bearing ring 20 that rotates with the shaft 28. Outer rotators have an outer bearing ring 22 that rotates with the hub 32. The ball bearings 24 are preferably evenly spaced within the inner and outer bearing rings 20, 22. The hub 32 has an inner surface 30 that may have a single circumference (FIGS. 2 and 3) or two circumferences 34, 36 (FIGS. 4 and 5).

Arguably, ferrofluid seals 40 are used on the majority of spindle motors produced today for hard disk drives. Further, ferrofluid seals 40 are now being used in other areas of the disk drive such as in the head-stack bearing cartridge assemblies, in other types of motors, and in the pivoting sections of machines that are used in high cleanliness environments. Accordingly, there is a great demand for effective ferrofluid seals 40.

Ferrofluid seals 40 are commonly used to provide a hermetic seal against gas and other contaminates in applications where a seal is needed between a shaft and its surroundings. In other words, ferrofluid seals 40 are capable of withstanding relative rotation between a shaft and its surroundings. Ferrofluid seals 40 may also be used in single seal motors in which there is a ferrofluid seal 40 at one end and a labyrinth seal or some alternative seal is at the other end.

Ferrofluid seals 40 are generally constructed of two O-shaped pole pieces 42a, 42b sandwiching an O-shaped magnet 44. The Ferrofluid 46 is positioned between the seal inner diameter 48a of the magnet sandwich and the outer diameter of a shaft 28. Magnetic flux holds the ferrofluid 46 in place. In other words, a ferrofluid seal 40 is an apparatus that includes magnetic fluid holding means for storing a magnetically permeable fluid between an inner element and an outer element, which are relatively rotated. The magnetic fluid holding means has a storage section for storing a part of the magnetic fluid that extends out of the magnetic fluid means. One exemplary ferrofluid seal apparatus is disclosed in U.S. Pat. No. 5,238,254 to Takii et al. Ferro Technologies, Inc., of Pittsburgh, Pa. produces other conventional ferrofluid seals 40. Ferro Technologies, Inc. produces several embodiments of ferrofluid seals 40 including, but not limited to, a Z-seal (FIG. 2), an OZ-seal (FIG. 3), a P-seal (not shown), and a U-seal (not shown).

Unfortunately, almost all ferrofluid seals are not perfect. The seal inner diameter 48a is not always a perfect circle and the seal outer diameter 48b is not always a perfect circle. Further, the center point of the seal inner diameter 48a and the center point of the seal outer diameter 48b are not always aligned. When the center points are not aligned then the seal inner diameter 48a and the seal outer diameter 48b are not concentric. A lack of concentricity between the seal inner diameter 48a and the seal outer diameter 48b can be referred to as runout.

The ferrofluid seals 40 are effective, but they are delicate and prone to splash and burst problems when they are installed incorrectly or contaminated due to particles or serious out-gassing. The likelihood of splash and burst problems is increased by the introduction of eccentricity between the ferrofluid seal inner diameter 48a (also called the seal operating face) and the shaft outer diameter (the surface against which the ferrofluid 46 runs). A splash or a burst is catastrophic because it ejects ferrofluid 46 into a clean environment. Further, a splash or burst may cause a complete seal failure that will then allow particles or outgassing to pass into the same clean environment.

Ferrofluid seals 40 are generally held in or part of known traditional seal carriers 50, 52 such as those shown in FIGS. 2 and 3. FIG. 2 shows a ferrofluid seal 40 held in one example of a conventional seal carrier 50. Conceptually this conventional seal carrier 50 would be substantially washer shaped with a central annular cutout or clearance into which the ferrofluid seal 40 would fit. FIG. 3 shows an alternative example of a conventional seal carrier 52 that is an extended pole piece 42b and, therefore, is an integral part of the ferrofluid seal 40. Specifically, the pole piece 42b of the alternative carrier 52 acts as the carrier itself and drops into the bearing bore (or hub inner surface 30) or bore that is, under ideal circumstances, concentric with the axis of rotation.

Both examples of conventional carriers 50, 52 are difficult to accurately place in a motor. Further, because the ferrofluid seals are typically placed into conventional carriers 50, 52 using a clearance or slip-fit, the ferrofluid seal can fit anywhere within the clearance and, most likely will be off-center. Accordingly, the seal carriers' additional clearances contribute to eccentricity and runout (where the seal inner diameter 48a is not concentric with the outer diameter of the carrier 50) problems.

Using the bearing for positioning is not unknown. For example, U.S. Pat. No. 5,876,126, to Marshall et al. (the "Marshall Patent"), which is assigned to the same assignee as the present invention and incorporated herein by reference, is directed to a motor incorporating a bearing guided labyrinth system. The motor includes a shaft, a hub, a bearing assembly, and a bearing guided labyrinth. The bearing assembly includes an inner bearing ring and an outer bearing ring separated by a plurality of ball bearings. The inner bearing ring has an inner annular ring surface and the outer bearing ring has an outer annular ring surface. The bearing guided labyrinth has an inner prong and an outer prong. The inner prong is at least partially positionable between the inner ring surface and the shaft. The outer prong is at least partially positionable between the outer ring surface and the hub. The outer prong grips the bearing assembly and specifically the outer annular ring surface of the outer bearing ring. Because the purpose of the bearing guided labyrinth system is to reduce particle emission, using the bearing to position the bearing guided labyrinth system, which allows for a tighter fit, is quite effective.

U.S. Pat. No. 5,227,686 to Ogawa includes a spindle motor embodiment in which a lower magnetic fluid sealing means is held in a holder that appears to be guided by an annular member. The lower sealing means is secured to the inner surface of the holder that is then attached to the annular member. The holder includes an annular leg that is positioned within an annular groove of the annular member. The annular groove would have to be a precision surface because it holds the holder and the lower sealing means. Accordingly, the annular groove would be difficult and expensive to produce in the annular member. The purpose of the lower sealing means is to seal the gap between the shaft and the holder and, most likely, to reduce particle emission.

BRIEF SUMMARY OF THE INVENTION

The present invention is directed to bearing guided ferrofluid seals and seal carriers that substantially reduce a motor's ferrofluid seals system's operating eccentricity and runout without significantly reducing the strength of the joint.

The present invention is directed to a bearing guided ferrofluid seal and seal carrier system that may be used in a motor or other type of rotating device that has a bearing assembly with an outer annular ring surface. The seal carrier of the present invention has a carrier ferrofluid seal surface and a carrier bearing surface. The carrier bearing surface includes a first carrier bearing surface and a second carrier bearing surface. A ferrofluid seal may be attached to the carrier ferrofluid seal surface. The second carrier bearing surface may be attached to the outer annular ring surface. In one preferred embodiment the first carrier bearing surface may be attached to the upper annular ring surface. In a separate preferred embodiment the ferrofluid seal may be attached to the carrier ferrofluid seal surface so that the seal inner diameter of the ferrofluid seal is fixtured to the second carrier bearing surface to reduce eccentricity between the two diameters.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
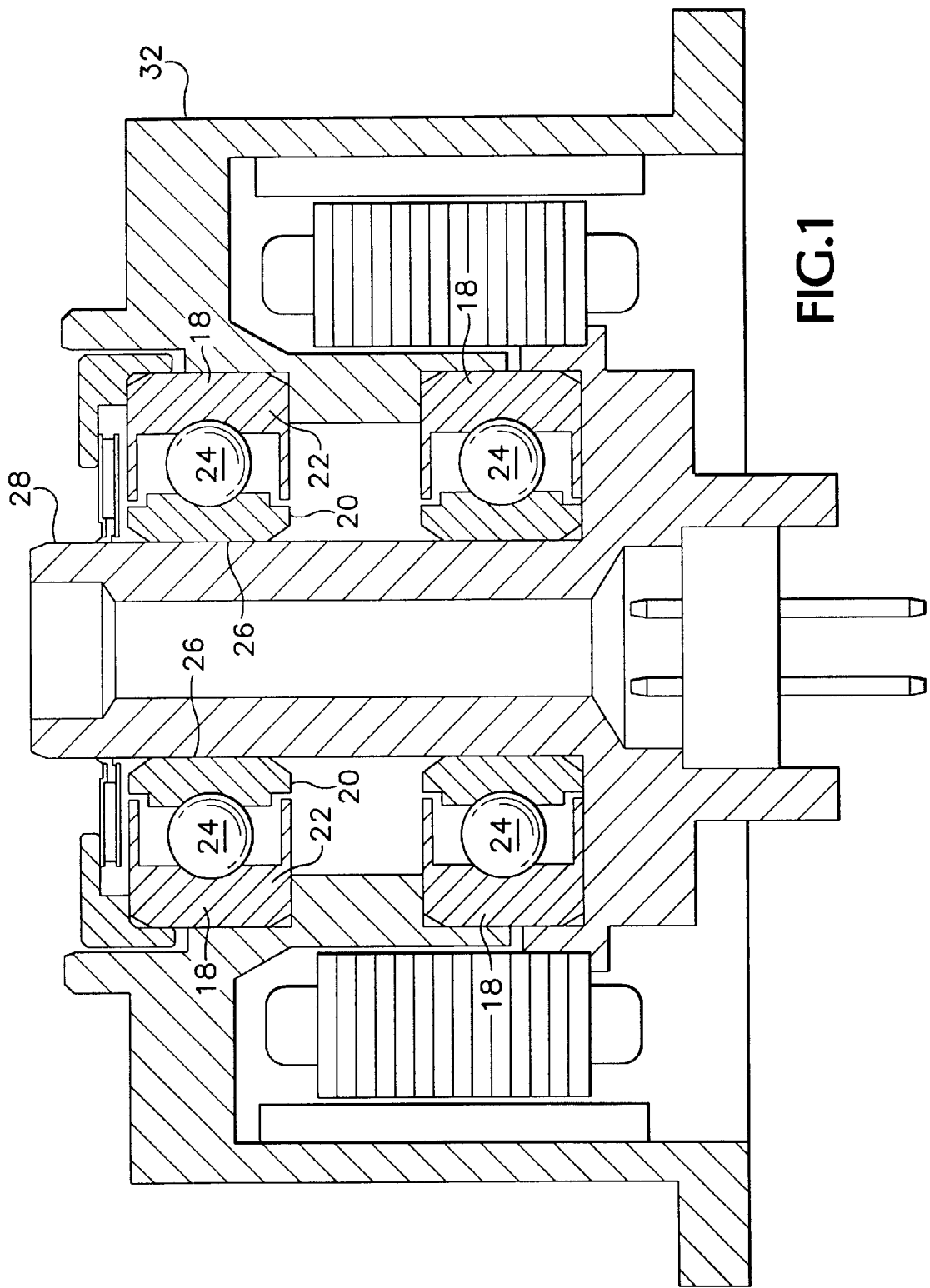
FIG. 1 is a sectional view of a spindle motor including a bearing guided ferrofluid seal and seal carrier according to a preferred embodiment of the present invention.

The present invention is directed to bearing guided ferrofluid seals 40 and seal carriers 60, 62 that substantially reduce a motor's seal system's operating eccentricity and runout without significantly reducing the strength of the joint. For example, the effect of runout (where the seal inner diameter 48a is not concentric with the seal outer diameter 48b) between the seal inner diameter 48a and the seal outer diameter 48b is reduced or eliminated because only the seal inner diameter 48a is used for fixturing. Another example is that clearance between the ferrofluid seal 40 and the seal carrier 60, 62 is no longer a problem because of fixturing. Still another example is that clearance between the carrier and the hub bearing bore or inner surface 30 (into which the bearing assembly 18 slides) is no longer a problem. A final example is that clearance between the hub bearing bore or inner surface 30 and the outer annular ring surface 56 of the outer bearing ring 22 is no longer an issue related to the seal system.

Figure 4:
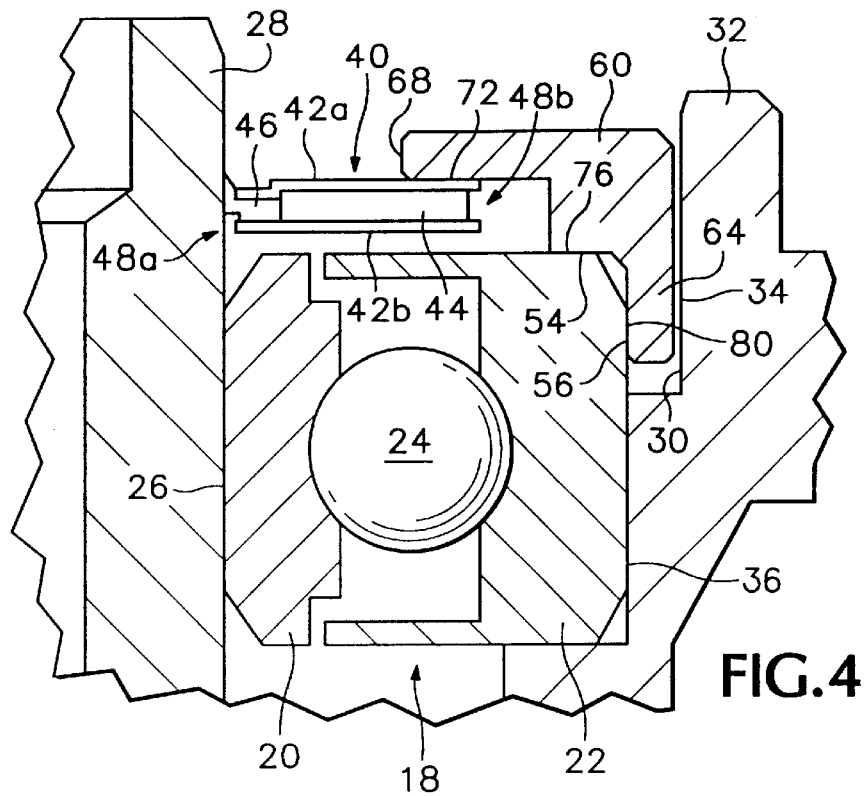
FIG. 4 is a detailed partial side sectional view of the bearing guided ferrofluid seal and seal carrier of the present invention as shown in FIG. 1.
Figure 5:
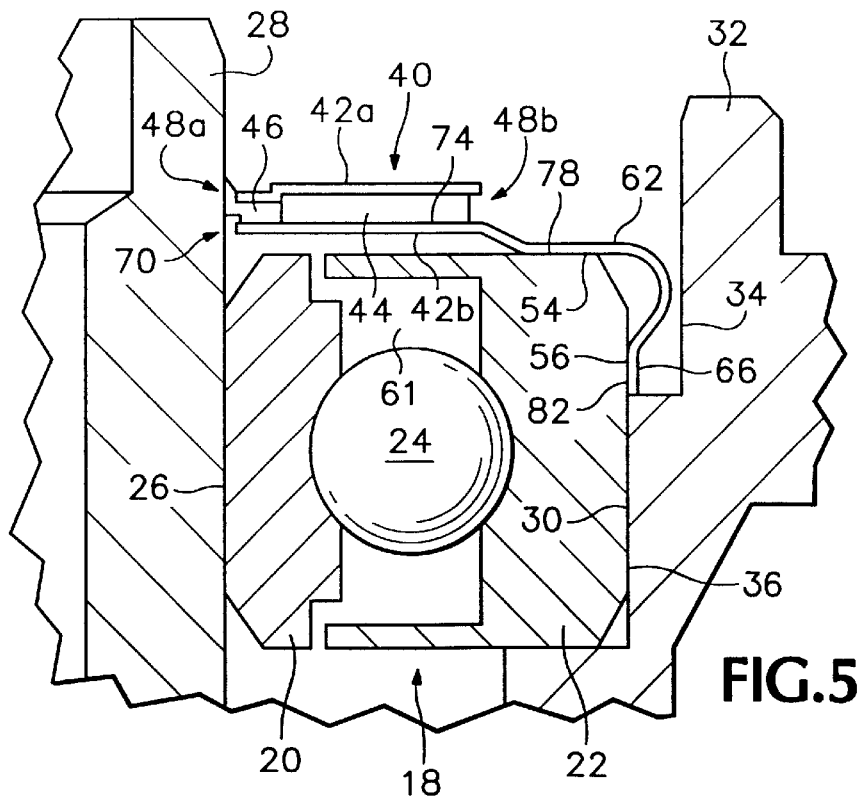
FIG. 5 is a detailed partial side sectional view of an alternative preferred embodiment of a bearing guided ferrofluid seal and seal carrier of the present invention.

As shown in FIGS. 4 and 5, motors incorporating the bearing guided ferrofluid seals 40 and seal carriers 60, 62 of the present invention preferably include a shaft 28, a hub 32 (that may be integral with the shaft 28), and a bearing assembly 18. The bearing assembly 18 preferably includes an inner bearing ring 20 and an outer bearing ring 22 that are, in one embodiment, separated by a plurality of ball bearings 24. The outer bearing ring 22 has an upper annular ring surface 54 and an outer annular ring surface 56. (It should be noted that if the bearing assembly were used upside-down, then the upper annular ring surface 54 would be the lowest surface.) In the shown preferred embodiment, the hub 32 has a first hub inner circumference 34 and a second hub inner circumference 36. Because the first hub inner circumference 34 is larger than the second hub inner circumference 36, there is room for the carrier prong 64, 66. It should be noted that an alternative embodiment of the present invention uses a hub having a single circumference and a outer bearing ring having two circumferences such that there is room for the carrier prong 64, 66. This alternative embodiment is conceptually similar to one embodiment of the bearing guided labyrinth shown and described in the Marshall Patent, which is assigned to the same assignee as the present invention and incorporated herein by reference.

The unique seal carriers 60, 62 can be described as being substantially L-shaped in cross-section. Conceptually, the unique seal carriers 60, 62 can be thought of as having a washer or O-type shape with an outer annular lip and an inner bore or hole. In cross-section the outer annular lip appears as a leg or prong and, for purposes of this specification, the annular lip will be referred to as a carrier prong 64, 66. The inner bore or hole of the seal carriers 60, 62 has a carrier inner diameter 68, 70. Each seal carrier 60, 62 also has a carrier ferrofluid seal surface 72, 74 that attaches to or is integral with the ferrofluid seal 40. Finally, each seal carrier 60, 62 has a carrier bearing surface at least partially comprising a first carrier bearing surface 76, 78 and a second carrier bearing surface 80, 82 that is preferably the inner annular surface of the carrier prong 64, 66.

Figure 2:
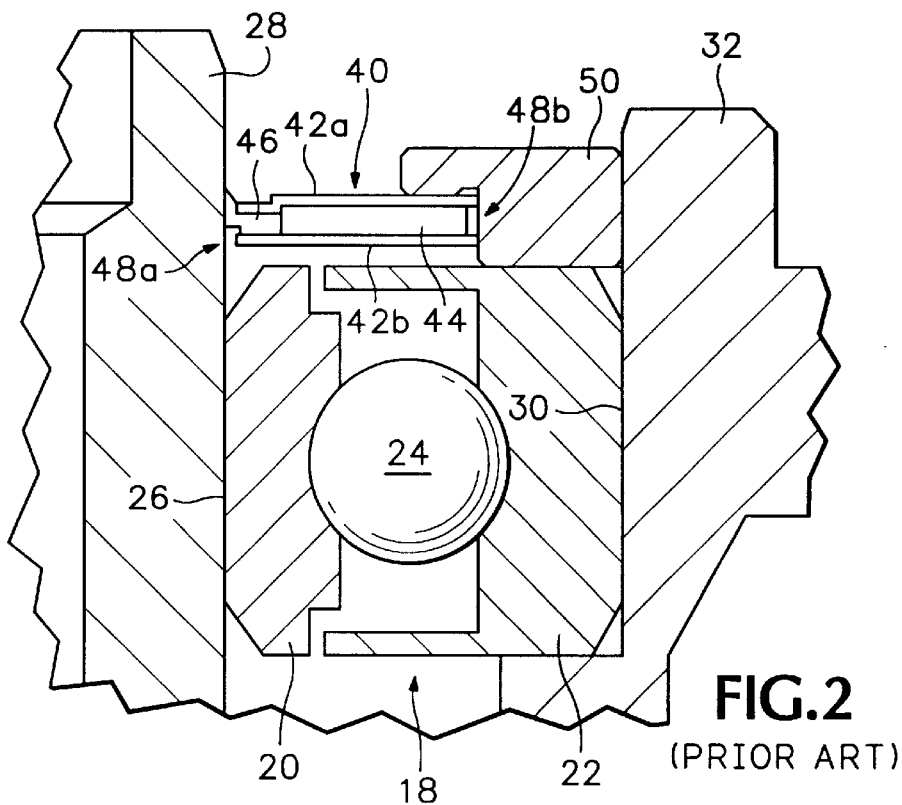
FIG. 2 is a partial side sectional view of a conventional Z seal ferrofluid seal which incorporates a conventional style seal carrier in its construction.

FIG. 4 shows one preferred embodiment of a seal carrier 60 for use with a ferrofluid seal 40 that is an adaptation of the conventional seal carrier 50 shown in FIG. 2. As set forth above, this embodiment of the seal carrier 60 can be thought of as having a washer or O-type shape with an outer annular lip which, in cross-section, is shown as a carrier prong 64. Although there is a central annular cutout similar to its counterpart conventional seal carrier into which the ferrofluid seal 40 would fit, the position of the ferrofluid seal 40 is not determined by the cutout. Instead, the ferrofluid seal 40 is carefully fixtured so that the seal inner diameter 48a is positioned in relation to the second carrier bearing surface 80 (which is the inner annular surface of the carrier prong 64). When attached to the bearing assembly 18, the first carrier bearing surface 76 mates with the upper annular ring surface 54 and, in the shown preferred embodiment, the second carrier bearing surface 80 mates with the outer annular ring surface 56.

Figure 3:
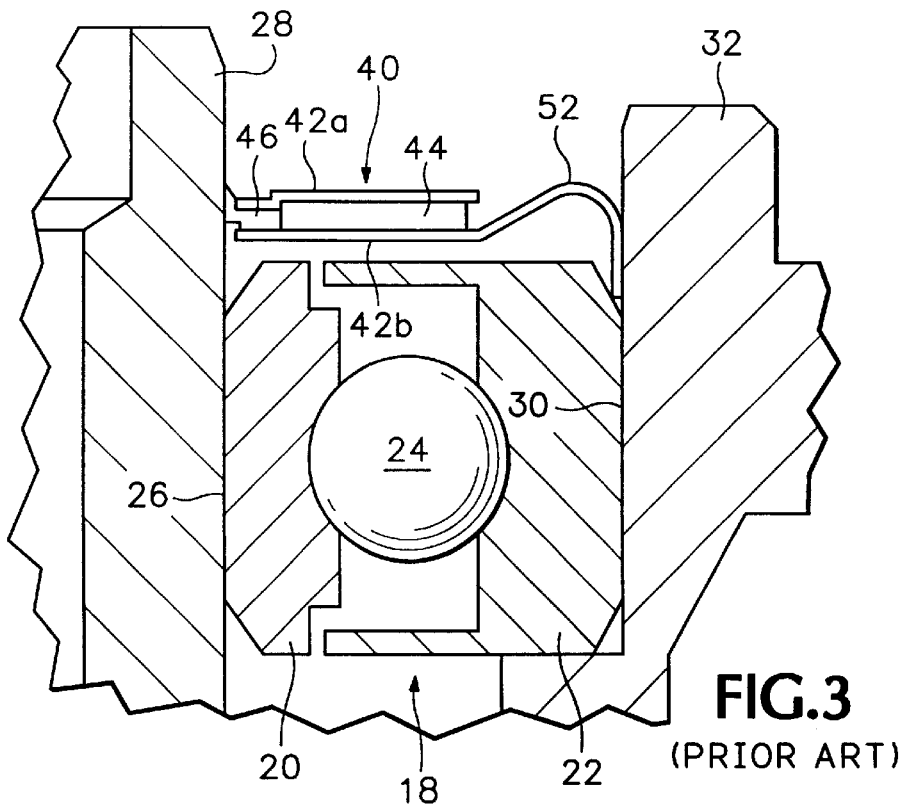
FIG. 3 is a partial side sectional view of a conventional OZ seal ferrofluid seal and an alternative exemplary conventional seal carrier.

FIG. 5 shows an alternative preferred embodiment of a seal carrier 62 for use with a ferrofluid seal 40 that is an adaptation of the conventional seal carrier 52 shown in FIG. 3. Like the conventional seal carrier 52, this embodiment of the seal carrier 62 is an extended pole piece 42b and, therefore, is an integral part of the ferrofluid seal 40. Specifically, the pole piece 42b of this carrier 62 acts as the carrier itself. As set forth above, this embodiment of the seal carrier 62 can be thought of as having a washer or O-type shape with an outer annular lip which, in cross-section, is shown as a carrier prong 66. In this embodiment, the ferrofluid seal 40 is manufactured in order that the seal inner diameter 48a is highly concentric with the second carrier bearing surface 82 (which is the inner annular surface of the carrier prong 66). When attached to the bearing assembly 18, the first carrier bearing surface 78 mates with the upper annular ring surface 54 and, in the shown preferred embodiment, the second carrier bearing surface 82 mates with the outer annular ring surface 56.

In assembling a motor and installing a bearing guided ferrofluid seal and seal carrier system of the present invention, the motor is first assembled substantially in a conventional manner including positioning the lower bearing assembly about a shaft, positioning the stator assembly about the shaft, positioning the top bearing assembly and the hub; pressing the motor together; and pre-loading the top bearing assembly. Then, the ferrofluid seal 40 is attached to the carrier ferrofluid seal surface 72 of the seal carrier 60 while being fixtured to surface 80. The fact that the ferrofluid seal 40 can be fixtured is significant. Unlike conventional carriers 50, 52 that use a slip-fit system, fixturing ensures greater positional accuracy. Finally, the second carrier bearing surface 80, 82 (which is the inner annular surface of the carrier prong 64, 66) is attached to the outer annular ring surface 56. The attachment may be done by press fitting, slip fitting, transition fitting, using an adhesive (applied either to the second carrier bearing surface 80, 82 or to the outer annular ring surface 56), or any combination of these methods. The order of these steps may be altered without effecting the scope of the invention.

The present invention may incorporate ferrofluid seals 40 including but not limited to, a Z-seal (FIG. 2), a P-seal (not shown), a U-seal (not shown), or would be a variant of the OZ-Seal (FIG. 3). U-seals have a slightly different construction than the shown seals, however they would be held in the unique carrier substantially as the other seals are held.

In most of the embodiments of the invention, the precision required for this component should be no greater than existing carriers and would be simpler to machine and measure than a bearing guided labyrinth, due to having a more basic cross-section.

Finally, the shown spindle motor and other components are meant to be exemplary. The bearing assemblies 18 and ferrofluid seals 40 may be upper or lower bearing assemblies. Alternative motors, such as inner or outer rotators, could be used. Alternative bearing assemblies, such as fluid bearings, could be used. Alternative bearing assemblies 18 may include no shield/seal, one shield/seal, or two shields/seals. The shields may be integral, as shown, or may be external such as the shields shown in U.S. patent application Ser. No. 08/581,058 that is assigned to the same assignee as the present application, the disclosure of which is hereby incorporated by reference. It is also possible to fixture the ferrofluid seals 40 in alternate arrangements such as above or below the carriers. It is also possible that the first carrier bearing surface 76, 78 is not attached to the upper annular ring surface 54 so that it requires fixturing in the axial direction (if the height is dictated by the surface 76, 78, then it would be self-fixturing). The bearing guided ferrofluid seals and unique seal carriers could also be used in any application where ferrofluid seals are currently used including motors, rotating members, pivoting members, or other conventional uses.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. In a motor having at least one rotating member, a bearing guided ferrofluid seal and seal carrier system comprising:

(a) a bearing assembly including an inner bearing ring and an outer bearing ring, said outer bearing ring having an upper annular ring surface and an outer annular ring surface;

(b) a ferrofluid seal having a seal inner diameter and a seal outer diameter;

(c) a seal carrier having a carrier ferrofluid seal surface and a carrier bearing surface, said carrier bearing surface at least partially comprising a first carrier bearing surface and a second carrier bearing surface;

(d) said ferrofluid seal being attached to said carrier ferrofluid seal surface; and (e) said second carrier bearing surface being matable with said outer annular ring surface.

2. The system of claim 1, said first carrier bearing surface being matable with said upper annular ring surface.

3. The system of claim 1, said ferrofluid seal being attached to said carrier ferrofluid seal surface so that said seal inner diameter is fixtured to said second carrier bearing surface in order to reduce eccentricity.

4. The system of claim 1 wherein said first carrier bearing surface is substantially perpendicular to said second carrier bearing surface.

5. The system of claim 1 wherein said upper annular ring surface is substantially perpendicular to said outer annular ring surface.

6. The system of claim 1 wherein said seal carrier is press fittable to said outer bearing ring.

7. The system of claim 1, said ferrofluid seal having an upper pole piece and a lower pole piece, said seal carrier being an extension of said lower pole piece.

8. The system of claim 1 further comprising a shaft and a hub, said shaft being stationary.

9. The system of claim 1 further comprising a shaft and a hub, said shaft being a rotating shaft, said shaft and hub functioning as an integral rotating unit.

10. A bearing guided ferrofluid seal and seal carrier system comprising:

(a) a bearing assembly having an upper annular ring surface and an outer annular ring surface;

(b) a ferrofluid seal having a seal inner diameter and a seal outer diameter;

(c) a seal carrier having a ferrofluid seal surface and a carrier bearing surface, said carrier bearing surface at least partially comprising a first carrier bearing surface and a second carrier bearing surface;

(d) said ferrofluid seal attached to said ferrofluid seal surface so that said seal inner diameter is fixtured to said second carrier bearing surface; and (e) said first carrier bearing surface being matable with said upper annular ring surface and said second carrier bearing surface being matable with said outer annular ring surface.

11. The system of claim 10 wherein said seal carrier is press fittable to said bearing assembly.

12. The system of claim 10 wherein said seal carrier is slip fittable to said bearing assembly.

13. The system of claim 10 wherein said seal carrier is transition fittable to said bearing assembly.

14. The system of claim 10, said ferrofluid seal having an upper pole piece and a lower pole piece, said seal carrier being an extension of said lower pole piece.

15. A method for installing a bearing guided ferrofluid seal and seal carrier system comprising:

(a) providing a bearing assembly having an outer annular ring surface, a ferrofluid seal having an inner diameter and an outer diameter, and a seal carrier having a ferrofluid seal surface and a carrier bearing surface, said carrier bearing surface having a first carrier bearing surface and a second carrier bearing surface;

(b) attaching said ferrofluid seal to said ferrofluid seal surface; and (c) attaching said second carrier bearing surface to said outer annular ring surface.

16. The method of claim 15 wherein said step of attaching said second carrier bearing surface to said outer annular ring surface further comprises the step of press fitting said second carrier bearing surface to said outer annular ring surface.

17. The method of claim 15 wherein said step of attaching said second carrier bearing surface to said outer annular ring surface further comprises the step of slip fitting said second carrier bearing surface to said outer annular ring surface.

18. The method of claim 15 wherein said step of attaching said second carrier bearing surface to said outer annular ring surface further comprises the step of transition fitting said second carrier bearing surface to said outer annular ring surface.

19. The method of claim 15 wherein said step of attaching said second carrier bearing surface to said outer annular ring surface further comprises the step of gluing said second carrier bearing surface to said outer annular ring surface.

20. The method of claim 19, said step of gluing said second carrier bearing surface to said outer annular ring surface further comprising:

(a) applying adhesive to said second carrier bearing surface; and (b) mating said second carrier bearing surface to said outer annular ring surface.

21. The method of claim 19, said step of gluing said second carrier bearing surface to said outer annular ring surface further comprising:

(a) applying adhesive to said outer annular ring surface; and (b) mating said second carrier bearing surface to said outer annular ring surface.

* * * * *